(12) United States Patent
Starita (10) Patent No.: US 7,074,027 B2
(45) Date of Patent: Jul. 11, 2006

(54) EXTRUSION DIE AND METHOD FOR FORMING DUAL WALL CORRUGATED PLASTIC PIPE AND DUAL WALL PLASTIC PIPE HAVING A FOAM ANNULAR CORE

(76) Inventor: Joseph M. Starita, 1180 W. 5th St., Marysville, OH (US) 43040

( * ) Notice: Subject to any disclaimer, the term of this patent is extended or adjusted under 35 U.S.C. 154(b) by 0 days.

(21) Appl. No.: 09/788,910

(22) Filed: Feb. 19, 2001

(65) Prior Publication Data

US 2004/0074554 A1    Apr. 22, 2004

(51) Int. Cl.
*B29C 47/06* (2006.01)
(52) U.S. Cl. ............... 425/133.1; 425/817 C; 425/192 R; 425/468; 425/381; 425/463; 425/466; 425/4 C; 425/382 R; 425/378.1
(58) Field of Classification Search ............... 138/137, 138/149; 264/150; 425/382 R, 817 C, 133.1, 425/190, 192 R, 468, 381, 463, 465, 466, 425/4 C, 378.1
See application file for complete search history.

(56) References Cited

U.S. PATENT DOCUMENTS

| | | | |
|---|---|---|---|
| 3,966,861 A | | 6/1976 | Papesh et al. |
| 4,182,603 A | * | 1/1980 | Knittel ............... 425/133.1 |
| 4,201,532 A | | 5/1980 | Cole |
| 4,770,618 A | | 9/1988 | Lupke |
| 4,789,327 A | * | 12/1988 | Chan et al. ............... 425/133.1 |
| 5,123,827 A | * | 6/1992 | Lupke ............... 425/133.1 |
| 5,346,384 A | | 9/1994 | Hegler et al. |
| 5,466,402 A | * | 11/1995 | Lupke ............... 264/39 |
| 5,511,964 A | * | 4/1996 | Hegler et al. ............ 425/326.1 |
| 5,542,834 A | * | 8/1996 | Lupke ............... 425/133.1 |
| 5,846,575 A | * | 12/1998 | Lupke et al. ........... 425/192 R |
| 6,045,347 A | | 4/2000 | Hegler |
| 6,343,919 B1 | * | 2/2002 | Rodriguez et al. ....... 425/133.1 |
| 6,787,092 B1 | * | 9/2004 | Chan et al. ............... 264/511 |

* cited by examiner

Primary Examiner—Joseph S. Del Sole
(74) Attorney, Agent, or Firm—Dinsmore & Shohl LLP (57) ABSTRACT

Extrusion dies for forming dual wall corrugated plastic pipe and dual wall plastic pipe having a foam annular core that provides homogenous melt flow to each axially displaced orifice by means of an individual concentric spiral mandrel are disclosed. Spiral mandrels transport the melt from the extruders initially in spiral paths and then to spiral paths having diminishing depths so that the melt from adjacent spiral paths mix axially resulting in an annular path of homogenous melt. Extrusion dies for real time, continuous and remote control of the openings of the axially displaced orifices by moving the die lip closest and furthest from the extruder in a precise manner are also disclosed. A means for controlling separation of the die lips for both the inner and outer wall walls of the pipe gives the pipe manufacturer the benefit of better controlling quality in real time and changing grades on the fly by controlling wall thickness.

9 Claims, 9 Drawing Sheets

EXTRUSION DIE AND METHOD FOR FORMING DUAL WALL CORRUGATED PLASTIC PIPE AND DUAL WALL PLASTIC PIPE HAVING A FOAM ANNULAR CORE

CROSS-REFERENCE TO RELATED APPLICATIONS

NONE.

STATEMENT REGARDING FEDERALLY SPONSORED RESEARCH OR DEVELOPMENT

Not applicable.

REFERENCE TO A MICROFICHE APPENDIX

None.

BACKGROUND OF THE INVENTION

The present invention relates to extrusion dies and methods used in forming dual wall corrugated plastic pipe and dual wall plastic pipe having a foam annular core. Dual wall plastic pipe products are utilized typically for drainage and sanitary sewer applications. See, for example, my co-pending applications for Letters patent, Ser. No. 09/579,782, "Mold Block and Methods for Thermoforming Large Diameter Corrugated Plastic Pipe" filed on May 26, 2000, now U.S. Pat. No. 6,652,258 and Ser. No. 09/597,338, "Joint and Seal for Large Diameter Corrugated Plastic Pipe and Method for Joining Plastic Pipe Sections" filed on Jun. 16, 2000, now abandoned. This invention is directed to extrusion dies having axially displaced orifices that define the size, quality and thickness of the inner and outer walls of dual wall plastic pipe products and dual wall plastic pipe products having a foam core.

This invention discloses apparatus and methods for enhancing melt homogeneity and remote real time continuous die lip adjustments for process control and "on the fly" changes of pipe characteristics.

BRIEF SUMMARY OF THE INVENTION

Extrusion dies for dual wall corrugated plastic pipe accept polymer melt from an extruder or plurality of extruders and form the polymer melt into inner and outer polymer melt parisons. The outer melt parison that exits the extrusion die orifice is subsequently thermoformed typically by means of a vacuum mold that travels with the polymer melt parison to create the transverse corrugations on the outer wall. These transverse corrugations act to stiffen the plastic pipe. The inner melt parison is typically past over a cooling and sizing mandrel and results in a smooth inner wall of the dual wall corrugated plastic pipe. Poly-olefins such as High Density Polyethylene (HDPE) and polyethylene/polypropylene copolymers and blends or mixtures thereof and polypropylene itself, may be utilized to manufacture dual wall corrugated plastic pipe for drainage and sanitary sewer applications (usually HDPE) and are generally manufactured from monomer by means of addition polymerization. Polymers produced by addition polymerization, characteristically vary both within a lot and between lots in molecular weight and molecular weight distribution. The relatively low thermal conductivity of polymer melts makes it difficult to uniformly heat them during the extrusion process causing temperature differences and temporal variations of melt temperature in the extrusion die. The variations in molecular weight, molecular weight distribution and temperature cause spatial and chronological variations in viscosity and elasticity during the extrusion process making it very difficult to control peripheral uniformity and temporal consistency of wall thickness and linear weight of the dual wall plastic pipe. The resulting variations in viscosity and elasticity often cause the extruded pipe walls to experience stress cracking, swirled surface appearance and dimensional product variations. The temperature dependence of the viscosity of polymer melts typically follows Arrhenius dependence as shown below:

$$\eta_o = Ae^{(-E/RT)}$$

where:
$\eta_o$=Viscosity at zero shear rate
A=Proportional Constant
E=Activation Energy=25 kJ/mole for High Density Polyethylene
R=Universal gas constant=8.314510 Joules/mole ° Kelvin
T=Absolute Temperature ° Kelvin Reference: Rohn, C. L., *Analytical Polymer Rheology*, p 141 (Hanser 1995).

The viscosity of polymer melts is proportional to the molecular weight to the 3.4 power as shown by the expression:

$$\eta_o = KM^{3.4}$$

where:
$\eta_o$=Viscosity at zero shear rate
K=Proportional Constant
M=Molecular weight Reference: Macosko, C. W. *Rheology Principles, Measurements and Applications*, p 498 (VCH Publishers, 1993).

The above expressions quantify the variations in viscosity caused by changes in temperature and molecular weight. Relatively small changes in temperature and molecular weight cause large changes in viscosity affecting both process ability and product performance. The challenge in designing an extrusion die is two fold:

1. To produce melt parisons that are spatially homogenous by removing localized variations in visco-elasticity caused by localized temperature variations and material property variations.
2. To produce chronologically consistent wall thickness and linear pipe weight by remotely controlling the orifice size of the inner and outer walls so that adjustments can be made in real time and continuously during the production process to compensate for material characteristics that change during the production cycle.

The prior art as it applies to spatial homogenous polymer-melt parisons exists for the extrusion of laminated multi-layer blown film. Since melt homogeneity is a primary prerequisite for uniform wall thickness in blown film processing, it has been found desirable to modify the configuration of the surface of an extrusion die mandrel to enhance melt homogeneity. In Papesh et al., U.S. Pat. No. 3,966,861; Richard R. Kniftel, U.S. Pat. No. 4,182,603; and Robert J. Cole, U.S. Pat. No. 4,201,532, the blown film extrusion die incorporates one or more helical or spiral grooves on the mandrel with the depth of the groove or grooves gradually decreasing toward the downstream end of the die with the grooves ending at some distance from the die orifice. Mandrels with this configuration are generally known as "spiral mandrels" and so shall be called here. The referenced patents, although they utilize a plurality of spiral mandrels, feed into a single orifice composed of a single pair of die lips.

It is an object of this invention to provide an extrusion die and methods for dual wall corrugated plastic pipe and for dual wall plastic pipe having a foam annular core that provide homogenous melt flow to each of a plurality of axially displaced orifices by means of an individual concentric spiral mandrel. Each spiral mandrel transports the melt from the extruder initially in spiral paths and then to spiral paths having diminishing depths so that the melt from adjacent spiral paths mix axially resulting in an annular path of homogenous melt that exits via its own individual orifice axially displaced the other orifices also fed by there own spiral mandrel.

The prior art as it applies to chronologically consistent quality in dual wall transverse corrugated plastic pipe describes manual adjustment of one of the pair of the lips that make up the orifice for the inner and outer walls of the dual wall pipe. Examples of patents that fall into this category are Manfred A. A. Lupke, U.S. Pat. No. 4,770,618 and U.S. Pat. No. 5,466,402; Ralph-Peter Hegler, U.S. Pat. No. 6,045,347 and U.S. Pat. No. 5,346,384; and Harry Chan U.S. Pat. No. 4,789,327. The problem that exists today is that the art does not address the need for real time continuous precise adjustments for dual wall plastic pipe extrusion die orifices.

It is thus an object of this invention to provide an extrusion die and methods for remotely controlling, in a real time, continuous and precise manner, the wall thickness and linear pipe weight of dual wall corrugated plastic pipe and of dual wall plastic pipe with a foam core by axially displacing the die lip(s) that is/are closest and furthest from the extruder. It is a further object to provide a means for internal heating of the die and maintaining a uniform and controlled temperature therein. This invention has the dual benefit of providing the capability to compensate for the chronological variations in material properties and to change the grade of the pipe being extruded.

It is a further object to provide a dual wall plastic pipe having a foam core.

The invention is described more fully in the following description of the preferred embodiment taken in conjunction with the drawings, in which:

DETAILED DESCRIPTION OF THE INVENTION

The invention describes an apparatus and methods for extruding dual wall corrugated plastic pipe by disclosing a preferred embodiment of an extrusion die constructed with outer and inner spiral mandrels to transport the polymer melt from an extruder initially in spiral paths and then to spiral paths having diminishing depths so that polymer melt from adjacent spiral paths mix axially resulting in an annular path of homogenous melt. In brief, extrusion dies and methods for forming dual wall corrugated plastic pipe and foam core plastic pipe are provided. Homogenous melt flow is directed to axially displaced orifices for the polymer melt by means of individual concentric spiral mandrels. The spiral mandrels transport the melt from the extruders initially in spiral paths and then to spiral paths having diminishing depths and the melt in the adjacent spiral paths mixes axially to produce an annular path of homogenous melt. The invention also provides improved extrusion dies and methods for real time, continuous and remote control of the openings of the axially displaced orifices. The die lips closest and furthest from the extruder are controlled in movement in a precise manner such that controlling separation of the die lips for both the inner and outer wall walls of the pipe allows the pipe manufacturer the benefit of better controlling quality in real time and changing grades on the fly by controlling wall thickness.

Figure 1:
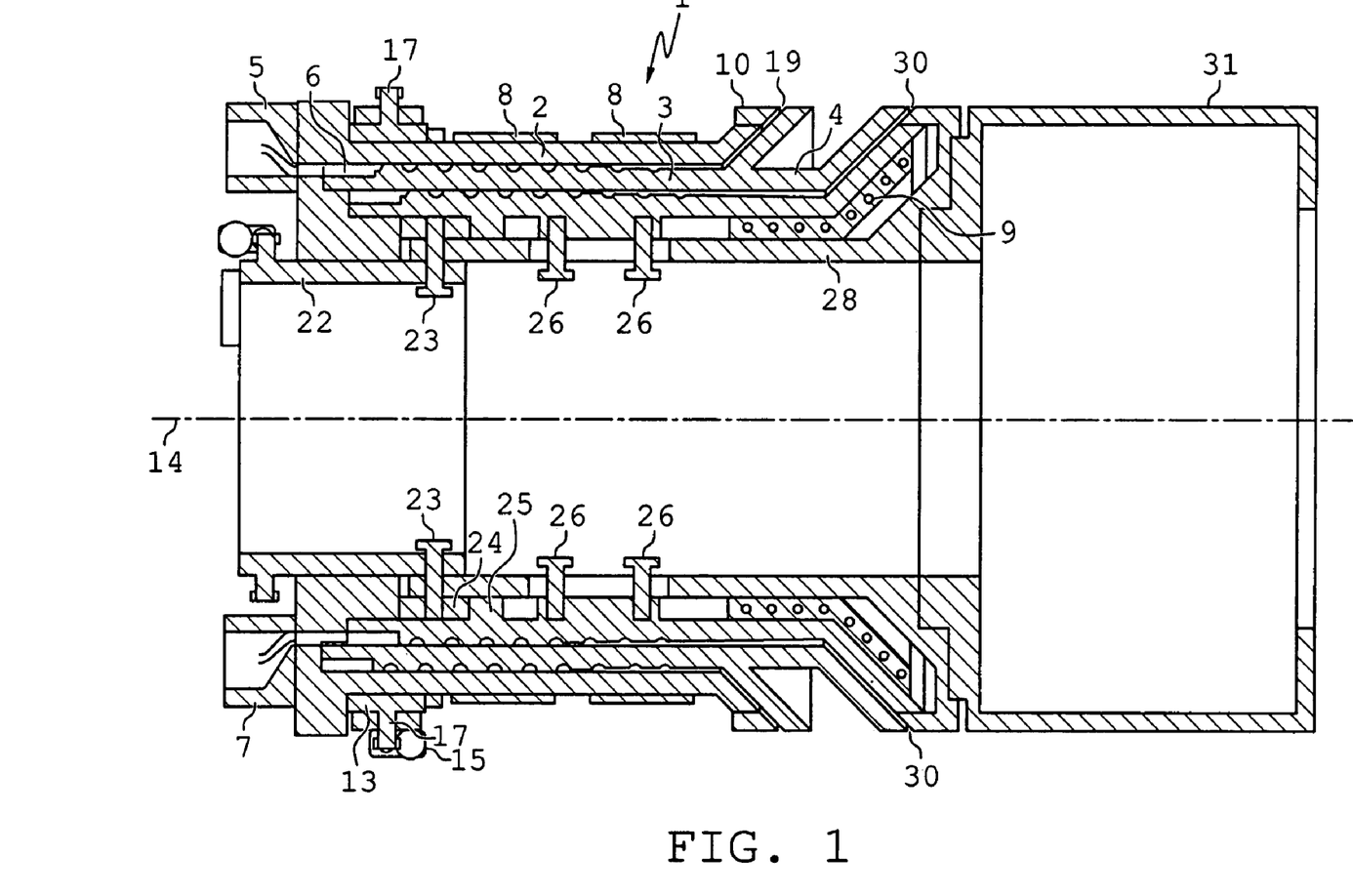
FIG. 1 is a cross sectional view of an extrusion die for a dual wall plastic pipe with spiral mandrels and remotely adjustable die lips.
Figure 2:
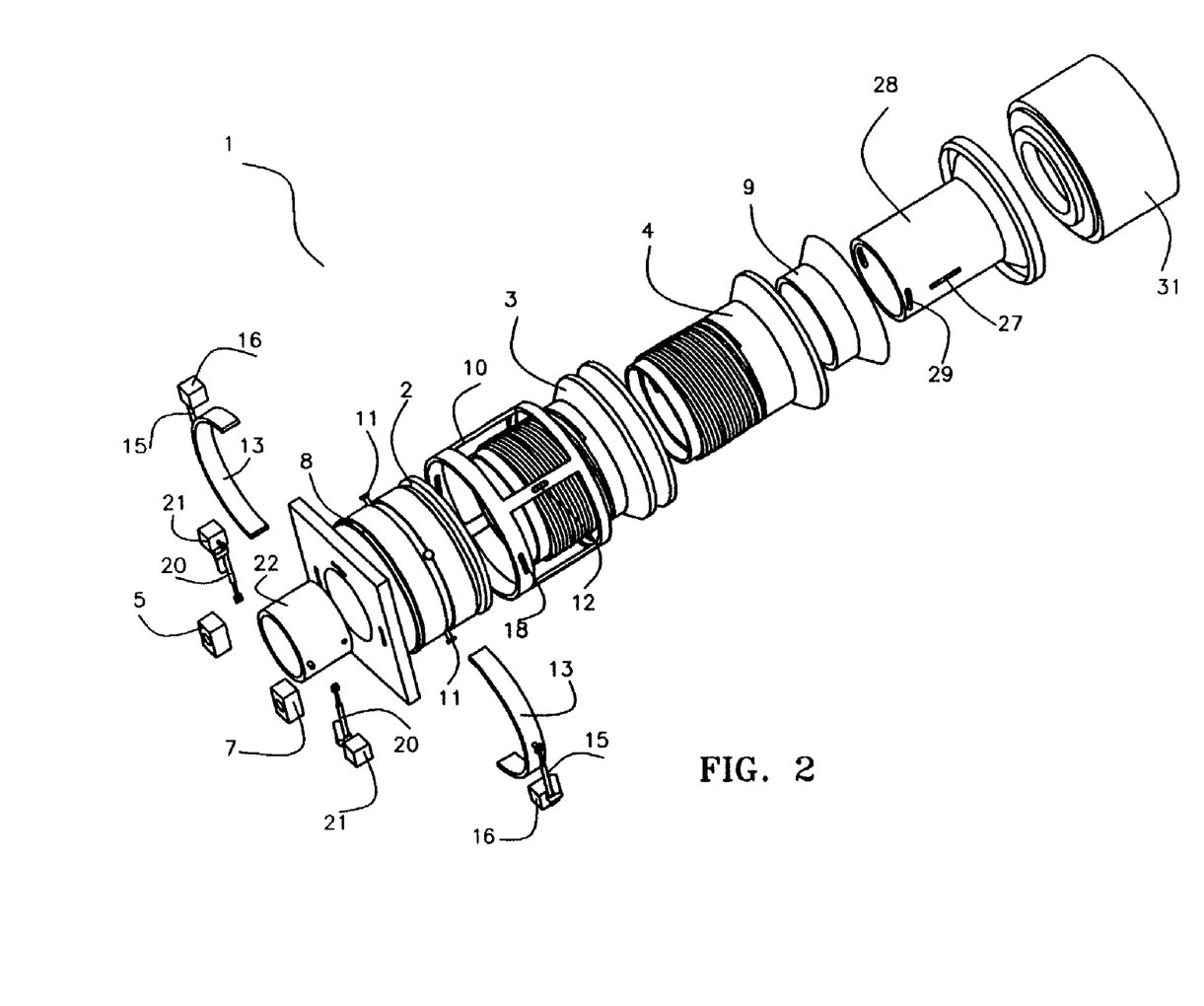
FIG. 2 is an exploded view of an extrusion die for a dual wall plastic pipe with spiral mandrels and remotely adjustable die lips.

FIG. 1, a cross sectional view of an extrusion die having outer and inner walls, shows the extrusion die 1 composed of a fixed outer cylinder 2, outer spiral mandrel 3 and inner spiral mandrel 4. The outer spiral mandrel 3 receives polymer melt from the extruder by means of a connector 5 that has an internal passage that transitions from a cylindrical tube to the annular manifold 6 at the entrance the outer mandrel 3. The inner spiral mandrel 4 similarly receives melt from a connector 7. Heaters, such as band heater 8 and tubular heater 9 accomplish the heating of the extrusion die 1. Tubular heaters are inserted into a cast or machined groove as shown at 9. The die lip closest to extruder is adjusted by linearly sliding the outer adjusting cylinder 10 axially. FIG. 2, an exploded view of the extrusion die 1 shows the outer adjusting cylinder 10 is restrained by an anti-rotating mechanism, pins 11 that ride in slots 12 as shown in the embodiment of FIG. 2. Although pins are shown in an example, other mechanisms useful for the same purpose, for example, splines and keyways, may be adapted in the invention. Split rings 13 shown in FIGS. 1 & 2 are rotated about axis 14 shown in FIG. 1 by linear actuators 15 that are anchored at one end by blocks 16 that are fixed to the base of outer cylinder 2. While the example employs linear actuators as preferred, other manual or automated control means, such as a turnbuckle, gear, screw, ratchet, lever and other devices may be adapted for the purposes of the invention. When the linear actuators 15 contract or extend they act together to rotate the split rings 13 shown in FIG. 2. The rotation of split rings 13 cause pins 17 to act against the slightly inclined surfaces of slots 18 in the outer adjusting cylinder 10 resulting in a fine and precise axial movement of the outer adjusting cylinder 10. This movement of the outer adjusting cylinder 10 has the effect of changing the orifice gap 19 shown in FIG. 1.

Similarly, linear actuators 20 anchored at one end by blocks 21, shown in FIG. 2, act together to rotate the inner ring 22 that acts on pins 23 fixed to ring 24 shown in FIG. 1. Ring 24 is restrained to only rotate by inner protrusion 25 on inner spiral mandrel 4. Pins 26 acting against axial slots 27 shown in FIG. 2 prevent the rotation of inner cylinder 28 so that the rotation of ring 24 and embedded pins 23 act against slightly inclined slots 29 in inner cylinder 28 that is so as to cause a fine and precise linear axial movement of the inner cylinder 28 that changes the size of orifice gap 30. The cooling and sizing mandrel 31 is mounted to and moves with the inner cylinder 28. The fine and precise linear axial motion of the inner cylinder 28 results in changes to the orifice gap 30 in FIG. 1.

Figure 3:
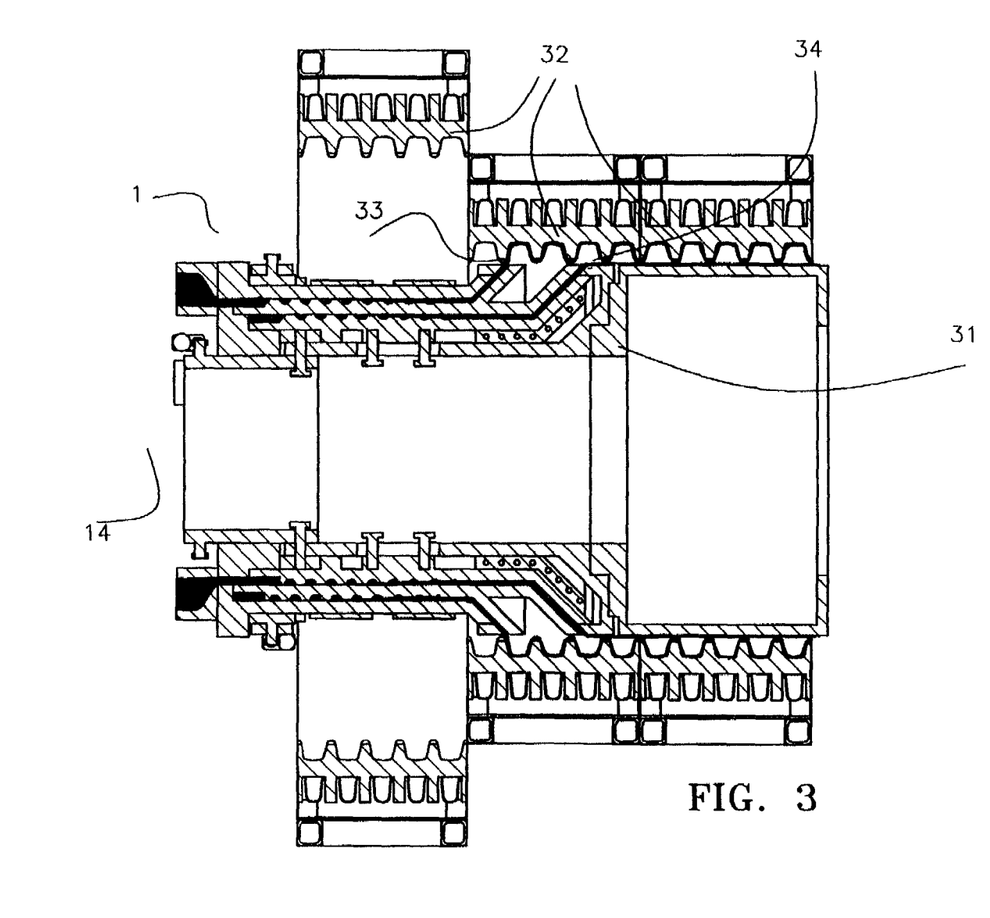
FIG. 3 is a cross sectional view of an extrusion die for dual wall plastic pipe and mold bases for thermoforming the external transverse corrugations.

FIG. 3 shows the extrusion die 1, three pairs of mold bases 32, the outer wall polymer melt parison 33 and the inner wall polymer melt parison 34. Mold bases 32 thermoform the transverse corrugations on the outer wall polymer melt parison 33. The cooling and sizing mandrel 31 insures the inner wall polymer melt parison forms a smooth inner liner for the dual wall corrugated pipe.

Figure 4:
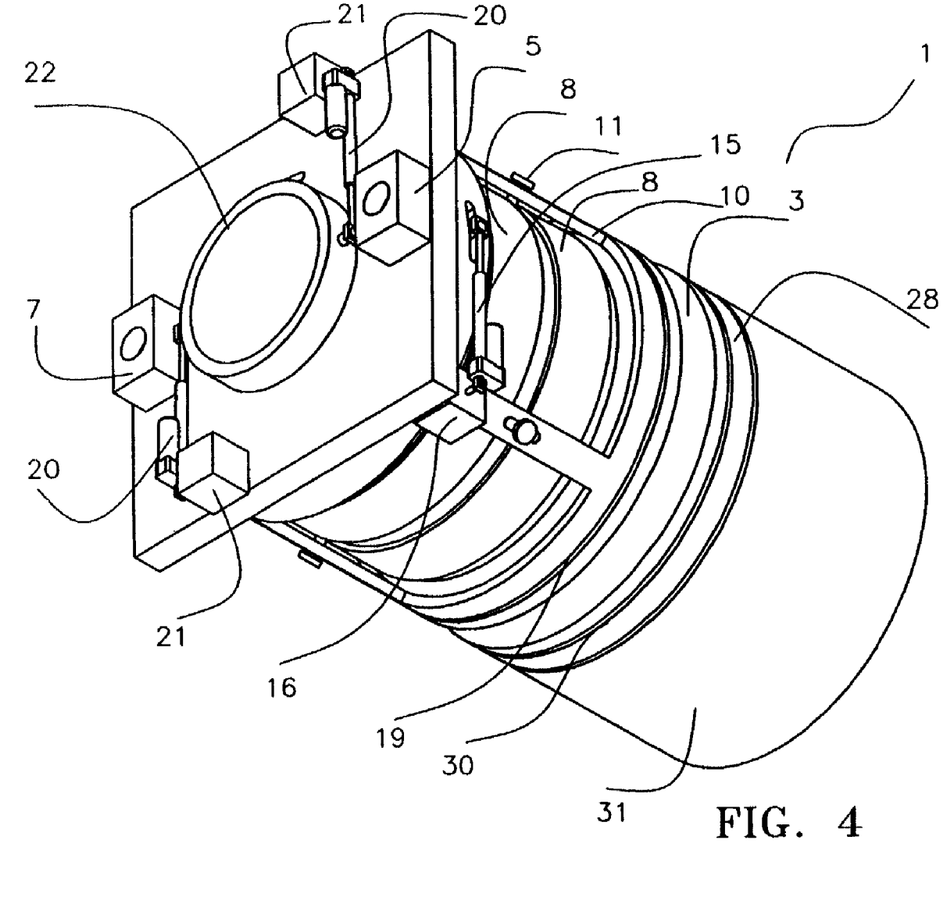
FIG. 4 is a perspective view of the assembled extrusion die for dual wall corrugated plastic pipe.

FIG. 4 is a perspective drawing of the assembled extrusion die 1 for dual wall corrugated plastic pipe. Polymer melt from an extruder enters extrusion die 1 through connectors 5 and 7. The polymer melt from connector 5 feeds into manifold 6 shown in FIG. 1 and along the outer spiral mandrel 3 having spiral grooves that diminish in depth as the axial distance increases. In this way the material in adjacent spiral grooves mix axially. The result is that spatially homogenous polymer exits the outer die wall orifice 19 shown in FIGS. 1 and 4. The size of the die orifice is modulated by the contraction and extension of linear actuators 15 in FIGS. 1 and 2 that change the size of the outer wall orifice 19 shown in FIGS. 1 and 4. Similarly, polymer melt from the same or another other extruder enters connector 7 shown in FIGS. 1 and 4 and travels along the inner spiral mandrel 4 and exits through the inner wall die orifice 30. The linear actuators 20 act together to modulate the inner wall die orifice 30 shown in FIG. 2. The capability of remotely modulating the orifice size in real time makes possible close loop control of linear pipe weight by coordinating the line speed of the mold bases shown in FIG. 3, screw speed of the extruder and the die orifice size therefore attaining time invariant and consistent product quality.

The invention facilitates the extrusion of dual wall plastic pipe having a foam annular core by providing a second embodiment of an extrusion die shown constructed with outer, middle and inner spiral mandrels to transport the melt from an extruder initially in spiral paths and then to spiral paths having diminishing depths so that melt from adjacent spiral paths mix axially resulting in an annular path of homogenous melt. Polymer melt fed from a first extruder enters the extruder die 101 shown in FIG. 5 through connector 102 to a manifold 103 along the surface of the outer spiral mandrel 104 and exits through the outer wall die orifice 105 forming the outer wall parison 106 shown in FIG. 6. Similarly polymer melt having a foaming agent, for example, a chemical additive or physical blowing, is fed from a second extruder through connector 106 shown in FIG. 5 into the manifold 107 along the surface of the middle spiral mandrel 108. The adjustable die lip ring 109 for the annular foam core allows an operator to manually adjust the foam core orifice 110 to be set small enough to insure a sufficient pressure drop across the orifice 110 so that the hydrostatic pressure upstream from the orifice 110 prohibits the mixture of polymer melt and blowing agent from foaming before it passes through the orifice 110 itself. Polymer melt from yet a third extruder enters via connector 111 shown in FIGS. 7 and 8 and fills manifold 112 in FIG. 5 and along the surface of the inner spiral mandrel 113 and exits through the inner wall die orifice 114.

Figure 5:
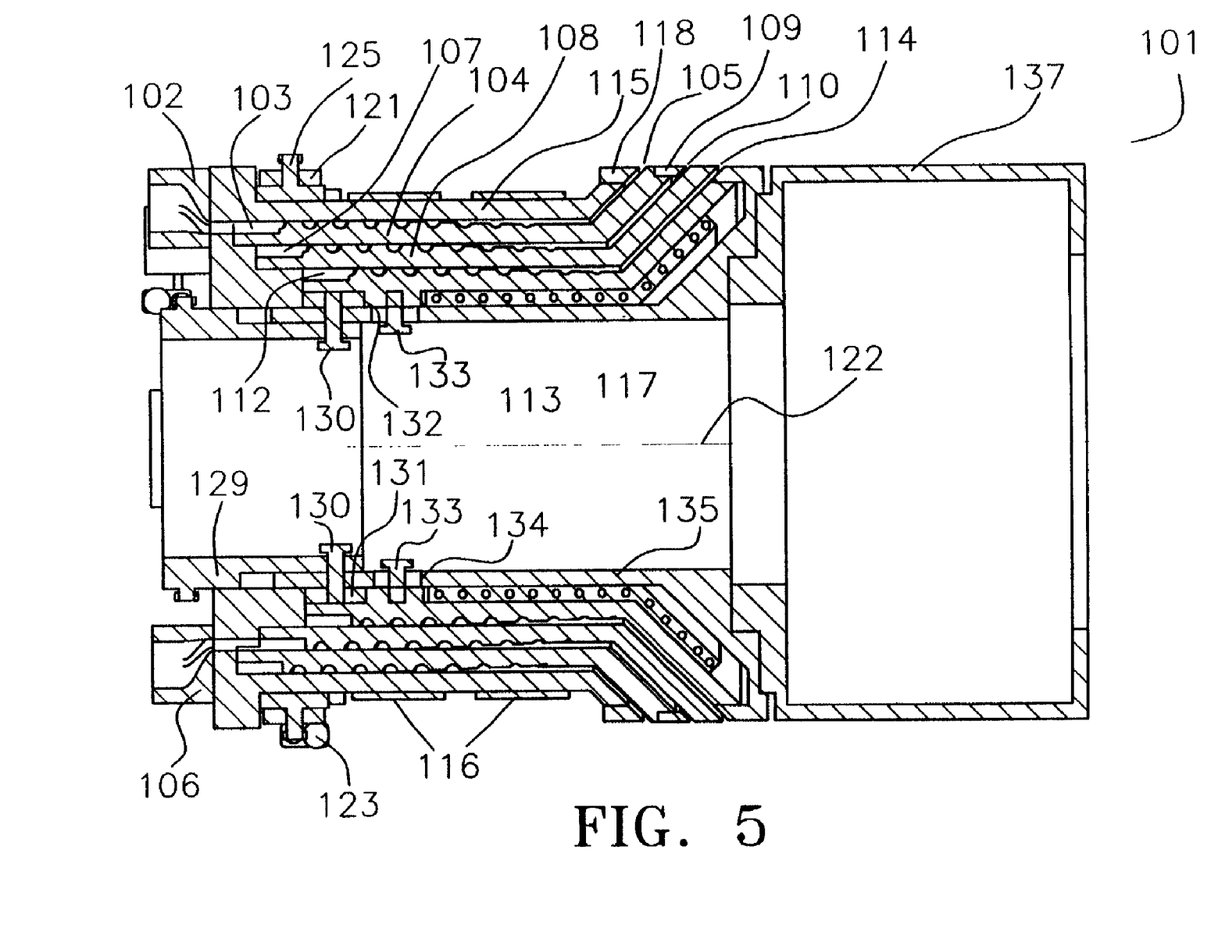
FIG. 5 is a cross sectional view of an extrusion die for dual wall plastic pipe having a foam annular core.
Figure 7:
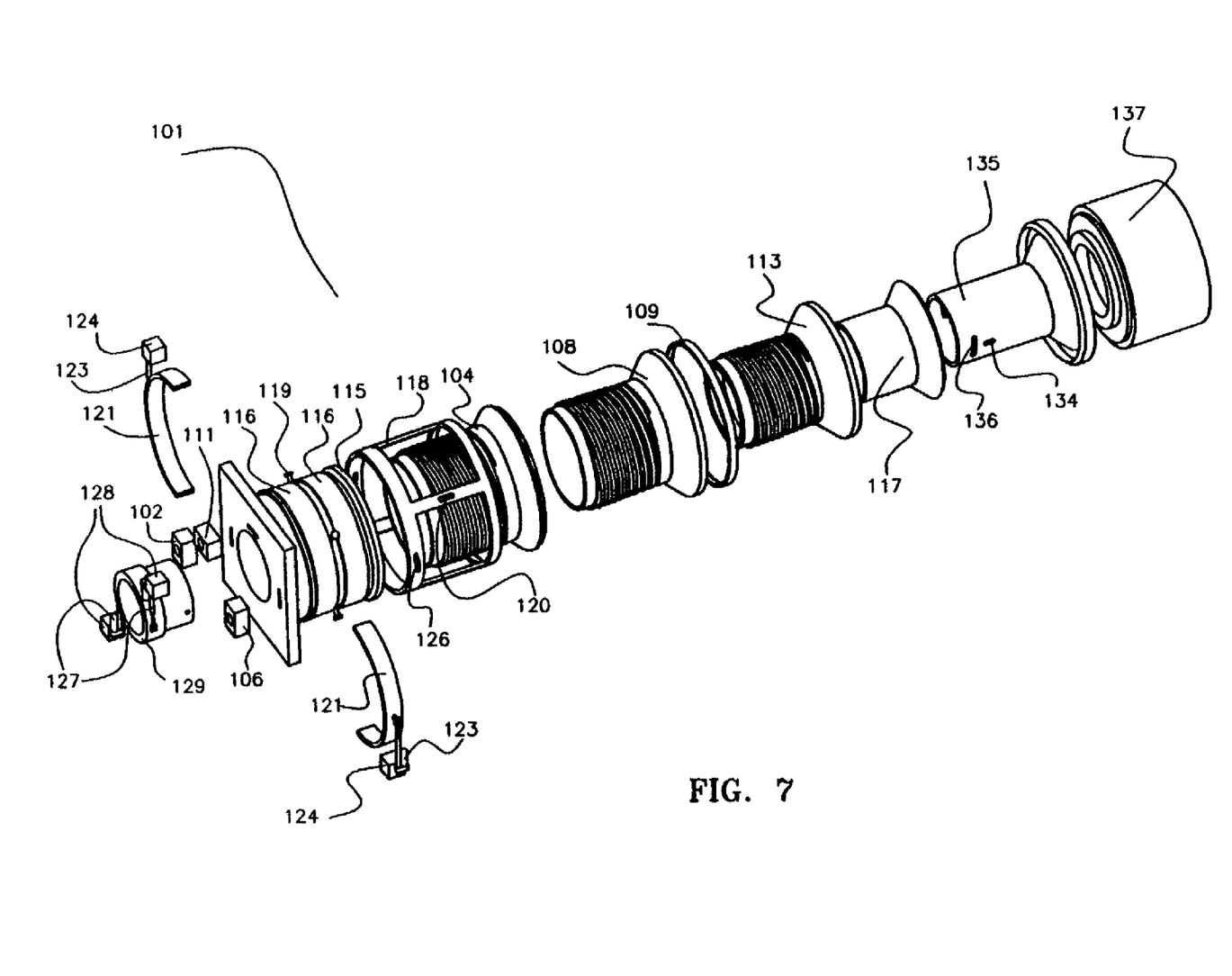
FIG. 7 is an exploded view of an extrusion die for a dual wall plastic pipe having an annular foam core.
Figure 8:
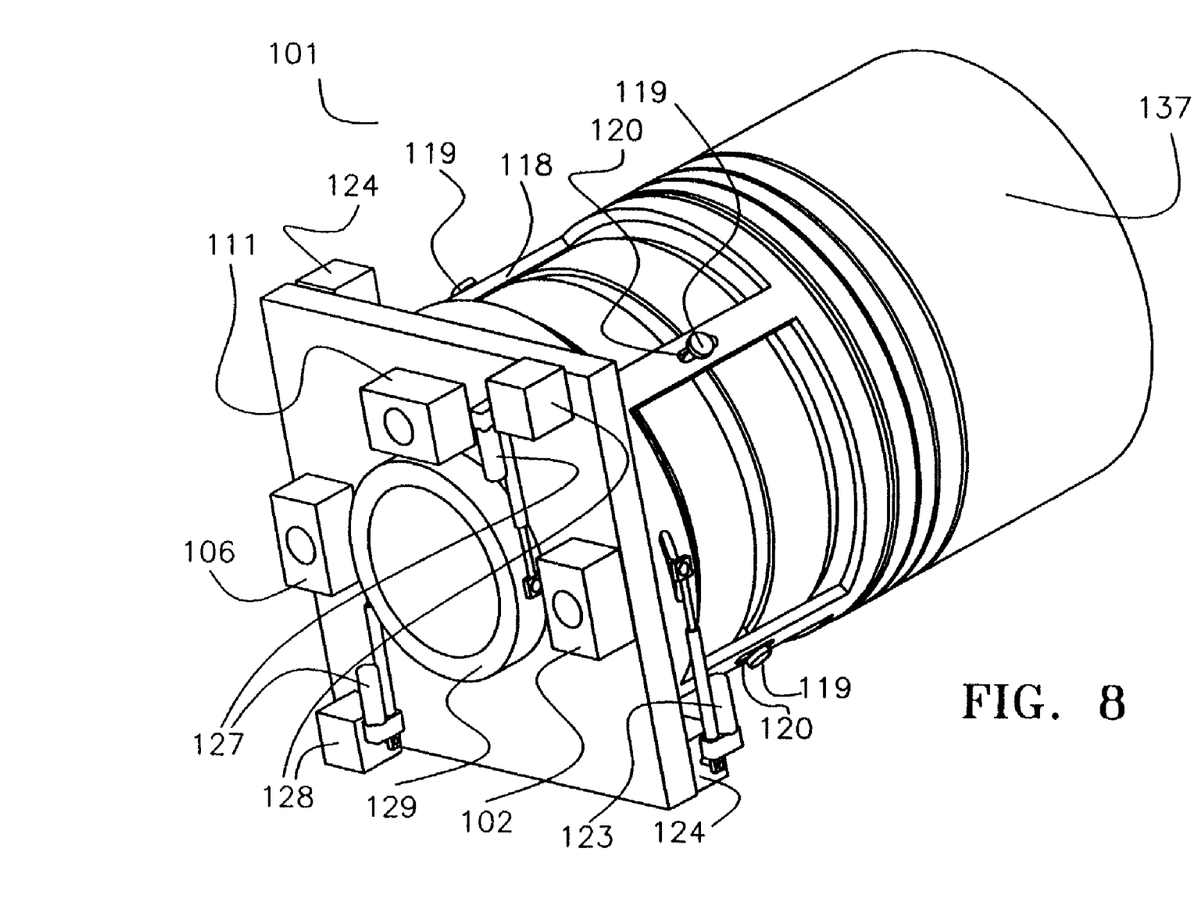
FIG. 8 is a perspective drawing of an extrusion die for a dual wall plastic pipe having an annular foam core.

FIGS. 5 and 7 shows the extrusion die 101 composed of a fixed outer cylinder 115, outer spiral mandrel 104, middle spiral mandrel 108 and inner spiral mandrel 113. Heaters such as the band heater 116 and tubular heater 117 accomplish the heating of the extrusion die 101. The die lip closest to extruder is adjusted by linearly sliding the outer adjusting cylinder 118 axially. FIGS. 7 and 8 show the outer adjusting cylinder 118 is restrained by anti rotating pins 119 that are constrained by slots 120. Split rings 121 shown in FIGS. 5 & 7 are rotated about axis 122 shown in FIG. 5 by linear actuators 123 anchored at one end to the base of outer cylinder 115 by blocks 124 shown in FIGS. 5, 7 and 8. When the linear actuators 123 contract or extend they act together to rotate the split rings 121 shown in FIGS. 5 and 7. The rotation of split rings 121 cause pins 125 to act against the slightly inclined surfaces of slots 126 in the outer adjusting cylinder 118 resulting in a fine and precise axial movement of the outer adjusting cylinder 118. This movement of the outer adjusting cylinder 118 has the effect of changing the orifice gap 105 shown in FIG. 5.

Similarly, linear actuators 127 anchored at one end by blocks 128, shown in FIGS. 7 and 8, act together to rotate the inner ring 129 that acts on pins 130 fixed to ring 131 shown in FIG. 5. Ring 131 is restrained to only rotate by inner protrusion 132 on inner spiral mandrel 113. Pins 133 in FIG. 5 acting against axial slots 134 shown in FIG. 7 prevent the rotation of inner cylinder 135 so that the rotation of ring 131 and embedded pins 130 against slightly inclined slots 136 in inner cylinder 135 that is so as to cause a fine and precise linear axial movement of the inner cylinder 135 that changes the size of orifice gap 114. The sizing and cooling mandrel 137 is mounted to and moves with the inner cylinder 135. The fine and precise linear axial motion of the inner cylinder 135 results in changes to the orifice gap 114 in FIG. 5.

Figure 6:
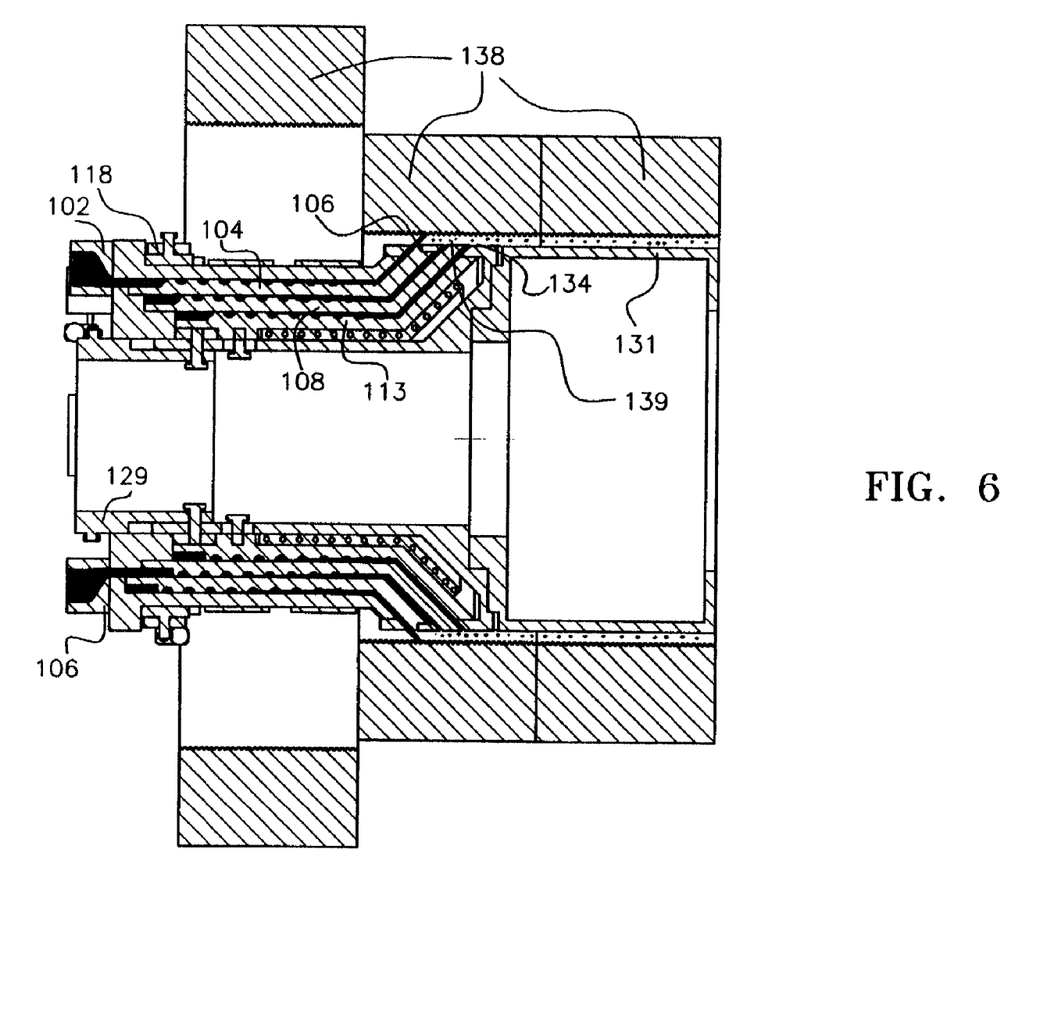
FIG. 6 is a cross sectional view of an extrusion die for dual wall plastic pipe having an annular foam core and mold bases for forming the outer wall polymer melt parison.

FIG. 6 shows the extrusion die 101, three pairs of mold bases 138, the outer wall polymer melt parison 106 and the inner polymer melt parison 134. Mold bases 138 act to provide a mold for the transverse corrugations on the outer wall polymer melt parison 106. In this embodiment the hydrostatic pressure caused by the foaming annular core 139 acts to push the outer wall parison against the mold bases and the inner wall melt parison against the sizing and cooling mandrel 131. The cooling and sizing mandrel 131 insures the inner wall polymer melt parison forms a smooth inner liner for dual wall plastic pipe having an annular foam core 139.

FIG. 8 is a perspective drawing of the assembled extrusion die 1 for dual wall plastic pipe having a foam annular core.

Figures 9, 9C, 9D:
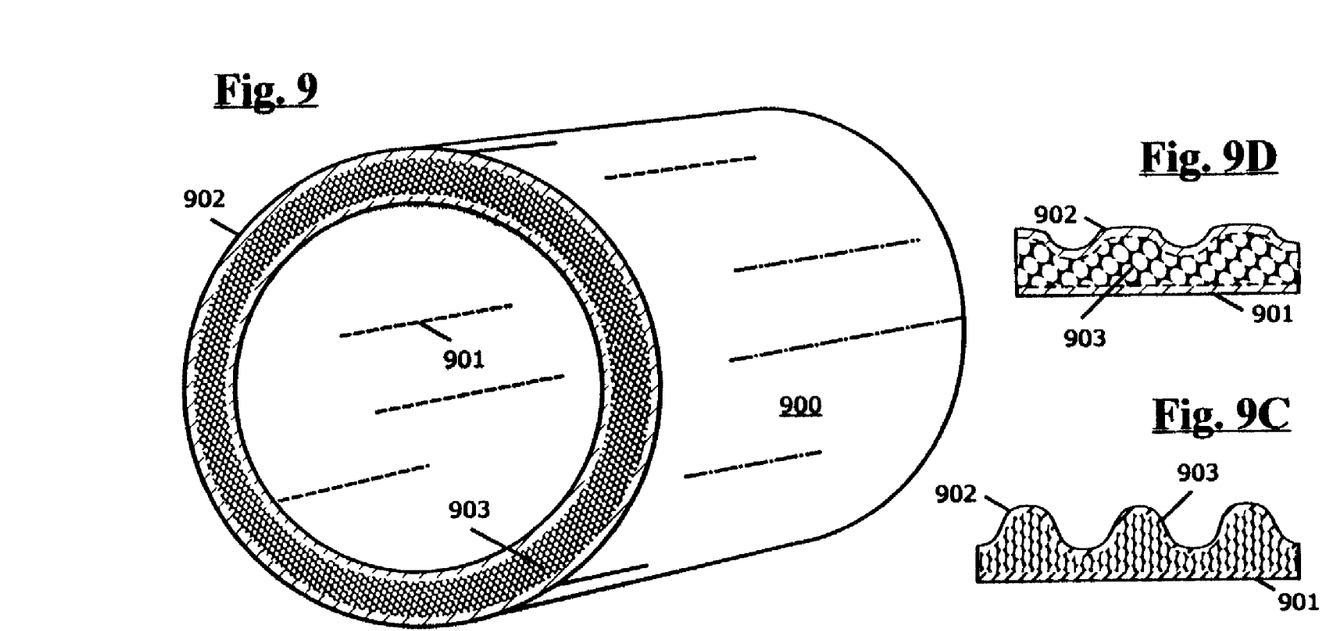
FIG. 9 is a figurative representation of a perspective view of a dual wall plastic pipe section having a foam annular core.
FIGS. 9B, 9C and 9D likewise show alternate figurative representation of forms of wall cross sections.

FIG. 9 shows a perspective view of a section of dual wall plastic pipe having a foam annular core. In FIG. 9, the pipe section 900 is formed from inner wall 901 extruded from polymer melt and outer wall 902 likewise extruded 15 from polymer melt in accordance with the method an apparatus described herein. The foam core of the pipe 903 includes a cell structure formed from a polymer melt material mixed with a foaming agent as described herein.

In an embodiment, the inner foam core is formed from a compatible high density polyethylene that is similar to if not the same as the polymer material forming the inner and outer walls. When cooled, the cell structure of the foam core will be formed from a polymer having physical properties predetermined by the melt material. The inner polymer core may have a composition different from the inner or outer walls. The chemical foaming agents employed (CFA's) are additives that produce a cellular structure in the extruded plastic melt. With sufficient heat, CFA's decompose to generate gases that expand the plastic by foaming and thereby forming bubbles within the polymer resin. CFA's are either exothermic or endothermic, depending on whether they radiate or absorb energy as the CFA reacts to generate a gas. Azodicarbonamide (AZ) is a widely used exothermic CFA that decomposes at about 190° C. to 230° C. to generate mostly nitrogen and small amounts of other gases. In an example of a preferred embodiment, AZ is used to foam the annular inner core, although a mixture of AZ with an endothermic CFA may produce a finer cell structure. Endothermic CFAs are usually blends of inorganic carbonates and polycarbonic acids that generate carbon dioxide gas. Endothermic CFAs typically produce a lower gas yield and pressure but produce a smaller cell structure than exothermic CFA's.

Figure 9A:
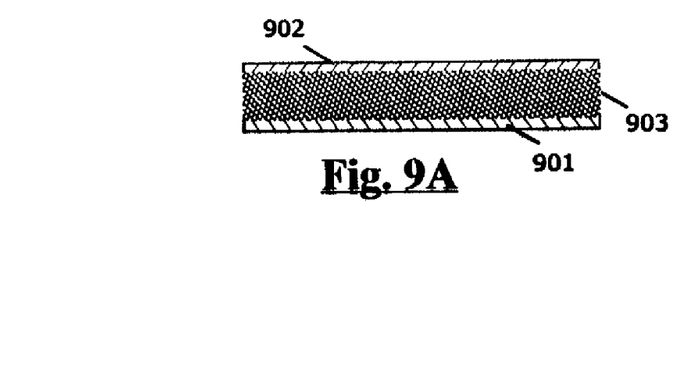
FIG. 9A is a wall cross-section of the pipe of FIG. 9.
Figure 9B:
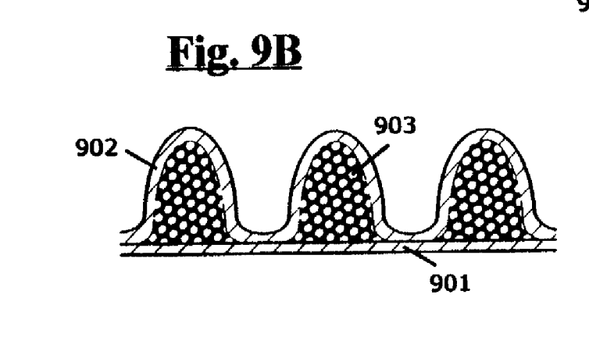

FIG. 9A shows a pipe wall cross section, in a direction transverse to the longitudinal direction of the pipe, of a dual wall plastic pipe shown in FIG. 9 having a foam annular core in a substantially laminate configuration in which the solid inner wall 901 and solid outer wall 902 engage the foam core 903 on opposite sides thereof. FIGS. 9B, 9C and 9D show pipe wall cross sections, also in a direction transverse to the longitudinal direction of the pipe, of corrugated forms of pipe wall. Other configurations of wall shape cross-sections are possible.

Having described the invention in detail, those skilled in the art will appreciate that, given the present disclosure; modifications may be made to the invention without departing from the spirit of the inventive concept herein described. Rather, it is intended that the scope of the invention be determined by the appended claims.

The invention claimed is:

1. An extrusion die for forming the inner and outer wall polymer melt parisons for dual wall corrugated plastic pipe, the die providing homogenous melt flow to two axially displaced orifices that form the inner and outer wall polymer melt parisons for the pipe comprising:

two individual concentric spiral mandrels operatively interconnected with an extruder source of polymer melt flow in which each spiral mandrel channels the flow of polymer melt from an extruder initially in spiral paths and then to spiral paths having diminishing depths such that the melt from adjacent spiral paths mixes axially to form an annular path of homogenous melt that is directed to flow to two distinct axially displaced die orifices that form the inner and outer wall polymer melt parisons for dual wall plastic pipe, whereby homogenous melt flow to two axially displaced orifices is provided.

2. The die of claim 1 including a heater embedded in the die for maintaining a controlled temperature therein.

3. In an extrusion die having axially displace die orifices for forming the iner and outer wall polymer melt parisons for dual wall corrugated plastic pipe, a means for controlling the die orifices comprising adjustment means for adjusting the rotary position of a first cylindrical member in a continuous fashion, wherein said cylindrical member is free to rotate and is constrained axially, said cylindrical member being configured to interact with a second concentric cylindrical member that is free to move axially but restrained from rotating such that the rotary motion of said first cylindrical member causes said second concentric cylindrical member to move axially.

4. The extrusion die of claim 3 including first and last axially displaced die orifices in which one of the orifices is controlled by the adjustment means.

5. The extrusion die of claim 3 including first and last axially displaced die orifices in which each of the orifices is controlled by the adjustment means.

6. The extrusion die of claim 3 in which the adjustment means is a mechanism selected from one or more of the group of gear, screw, lever and ratchet mechanisms.

7. The extrusion die of claim 3 in which the adjustment means is a linear actuator.

8. An extrusion die for forming the inner wall, an internal annular foam core and outer wall for a dual wall plastic pipe having a foamed core comprising:

three individual concentric spiral mandrels, each spiral mandrel adapted to channel the flow of polymer melt from an extruder initially in spiral paths and then to spiral paths having diminishing depths such that the melt from adjacent spiral paths mixes axially resulting in an annular path of homogenous melt and thereupon to three distinct axially displaced die orifices that respectively form the inner wall, an internal annular foam core and the outer wall polymer melt parisons for the pipe, whereby homogenous melt flow to the three axially displaced orifices is provided.

9. The die of claim 8 in which the opening in the second orifice is adjustable.

* * * * *